Aug. 25, 1964 W. J. HORVEREID 3,145,423
AIR-RELEASING MOLD
Filed Sept. 25, 1961
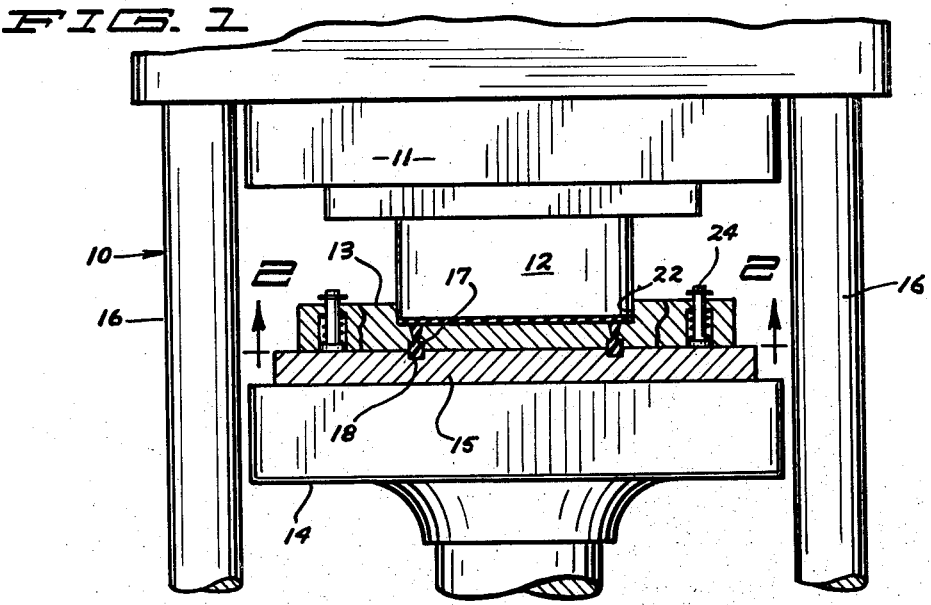
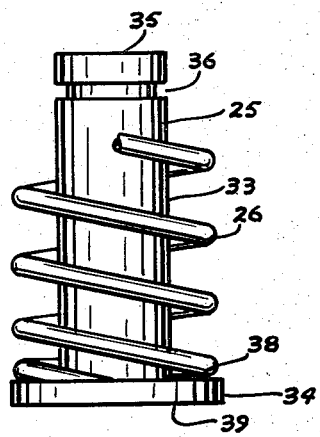
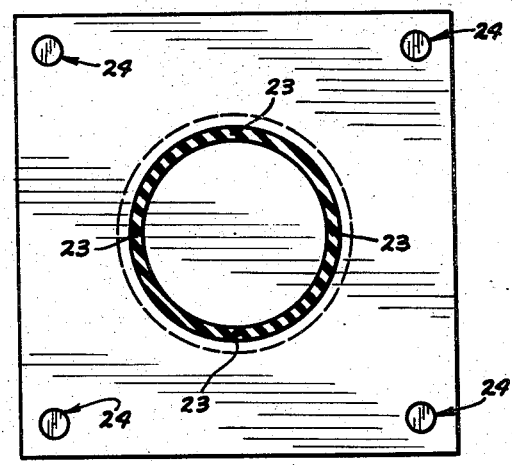
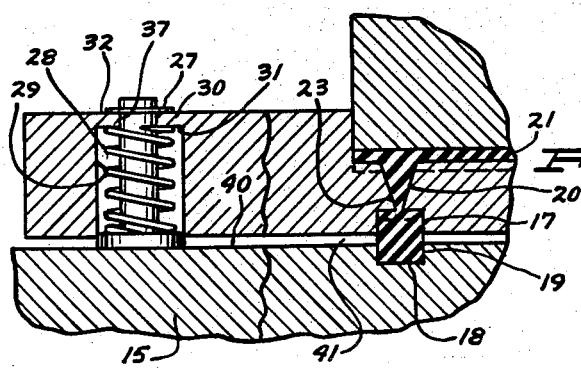
INVENTOR.
WELLS J. HORVEREID
BY
ATTORNEY

United States Patent Office 3,145,423
Patented Aug. 25, 1964

3,145,423
AIR-RELEASING MOLD

Wells J. Horvereid, Minneapolis, Minn., assignor to Precision Associates, Inc., Minneapolis, Minn., a corporation of Minnesota
Filed Sept. 25, 1961, Ser. No. 140,482
1 Claim. (Cl. 18—42)

This invention relates to the molding of rubber and rubber-like materials and more particularly to an improvement in the mechanism for molding such materials.

The molding of rubber products such as small O-rings and the like is often accomplished by placing a volume of material in a mold cavity and then kneading the material to the desired shape. Another method is by forcing molten rubber into a mold cavity after which the rubber is allowed to set. These methods will, of course, be readily recognized by those skilled in the art.

Since the molds in this art are necessarily machined to a high degree of accuracy, a problem arises in the expelling of entraped air from the mold cavity so that a full charge of material can be introduced into the mold and so that no air pockets will be formed in the final product. A method of eliminating trapped air is to slightly separate the mold plates through manual controls to thereby allow the material to force the air out of the cavity and allow the material to flow in. Opening and then closing the separation between molds in a rapid sequence is referred to in the art of "bumping." The "bumping" operation is carried on in such a manner that compressed air can escape but the mold is again closed before the plastic material can flow into the separation.

When the bumping operation is performed, the results are usually not uniform. In bumping some products, the separation between mold plates must be held closely to a certain percentage of the height of the product if the trapped air is to escape. With some products, the control over the separation amount is quite critical and requires a series of bumping operations for each molding cycle. It is therefore a general object of this invention to provide a means for controlling the degree of separation of the mold plates when being bumped thus allowing all subsequent products to be identically controlled in their casting operation when formed in the same mold.

More specifically, it is an object of this invention to provide an accurate means for controlling the mold plate separation during the bumping operation in a maner which is simple and yet reliable.

Another object of this invention is to provide a mold bumping assemblage which is economical in construction and easily installed on rubber molds and the like.

These and other objects and advantages of this invention will more fully appear from the following description, made in connection with the accompanying drawing, wherein like reference characters refer to the same or similar parts throughout the several views and in which:

FIGURE 1 is a partial side view or a rubber mold machine, portions thereof not necessary to a full understanding of the present invention being removed beyond the broken line. Portions of the figure are in full line drawing;

FIGURE 2 is a view of FIGURE 1 taken on line 2—2;

FIGURE 3 is an enlarged side view of the bumping post and bias means; and

FIGURE 4 is a detailed segment of FIGURE 1 showing in greater detail the elements of the mold apparatus.

Referring again now to FIGURE 1, the main elements of a rubber mold apparatus 10 are shown. The structure consists principally of opposing assemblies, the upper assembly having an upper platform 11, ram 12 and an upper mold plate 13, the lower assemblage consisting principally of a lower platform 14 and a bottom mold plate 15. To structurally support the upper assemblage, a plurality of columns 16 are provided which also confine the upper and lower assemblages to a conversion along a common axis whereby the upper mold cavity 17 and lower mold cavity 18 will meet properly as shown in FIGURE 1.

As partially shown in FIGURE 4, the upper and lower mold cavities 17 and 18 respectively constitute a mold chamber 19 in which the rubber product is molded. It is understood that in some instances it is possible to have the entire mold chamber 19 formed in one or the other of mold plates 13 and 15. Feeding into the upper cavity is a frusto-conically shaped delivery funnel or sprue 20 which communicates molten material 21 into the mold chamber 19. Referring again to FIGURE 1, the molten material 21 is allowed to freely flow within a recess portion 22 of upper mold plate 13. Recess 22 communicates with the upper cavity 17 at four funnel positions 23 as shown in FIGURE 2.

Positioned in the four corners of the upper mold plate 13 are bumper assemblies referred to generally as 24, as may be seen in FIGURE 2. Referring to FIGURES 3 and 4 for more detailed explanation of the bumper assemblage, it may be seen that the entire assemblage has three main elements, namely, a bumping post 25, a bias means such as compression spring 26, and a retainer ring 27. The spring, as seen in FIGURE 4, and the majority of bumping post 25 are housed within a bore 28 which is defined by a side wall 29 and a shoulder 30. Shoulder 30 in turn has an under side 31 and an upper surface 32 which is flush with the upper surface of upper mold plate 13.

Referring to FIGURE 3, each bumping post 25 has a cylindrical portion 33 which terminates downwardly in a base 34 and upwardly in a crown 35 which is separated from the cylindrical portion by an annular retainer ring groove 36. The cylindrical portion 33 is of a diameter adapted to receive the convolutions of compression spring 26. The base 34 is of a diameter which will slidably interfit with the side wall 29 diameter for purposes to become apparent subsequently. As seen in FIGURE 4, the cylindrical portion 33 of bumping post 25 is also of a diameter to slidably interfit with opening 37 in the shoulder 30. Thus, when the bumping post 25 is caused to move along its axis, so that the base 34 is in contact with side wall 29 and cylindrical portion 33 is in sliding contact with bore 37, the bumping post will be confined to axial movement under the bias of the compression spring 26.

Interfitted into the annular groove 36 is the retainer ring 27 which rests against the upper surface 32 of shoulder 30 and locks the bumping post from further extension into the bumper bore 28 by forcing upwardly upon the crown 35 by way of the groove 36. The function and purpose of a retainer ring operating in this manner is presumed understood by those skilled in the art. Since the base 34 is larger in diameter than the cylindrical portion 33, the compression spring 26 is thus allowed to rest upon the upper surface 38 of base 34 and, as seen in FIGURE 4, rest at the upper end thereof against the cavity side 31 of shoulder 30. Thus when under compression the spring will force the base 34 downwardly so that the bottom surface 39 of the base will exert pressure against the upper surface 40 of bottom mold plate 15. The pressure, however, is limited by the amount of travel permitted of the bumping post 25 into the bore 28 because of retainer ring 27.

In the use and operation of this invention, molten material 21 is placed within recess 22 after which the ram 12 is lowered whereby to seat upon the molten material and ultimately force the material, via delivery funnels 20, into the mold chambers 19. It will be recognized that as the ram 12 exerts pressure against the molten material, the ram also exerts pressure against the upper mold plate 13 via the material and thus exerts force in counteraction of the compression spring bias. By first compressing, then momentarily oscillating the ram 12 up and down upon the molten material, molten material is first forced into the mold chamber, after which the pressure is released and the compression spring returns the upper mold plate 13 to a predetermined location which defines predetermined spaced separation 41 between upper mold plate 13 and bottom mold plate 15 as seen in FIGURE 4. With the separation 41, air is free to escape in controlled manner between the mold plates and thus allow the molten material 21 to freely flow into the mold chamber. With the rapid succession of the ram pressure against the molten material, the air previously contained within mold chamber 19 will be completely forced outwardly between the mold plates and thus the undesirable air pockets will be prevented from finally molding into the final product. Since the bumping assemblage 24 may be provided with any compression spring having a desired resilience, and the bumping posts may be interchanged whereby to provide a greater distance or lesser distance between lower surface 39 of the base 34 and the annular groove 36, it is seen that the space 41 between mold plates may be varied according to the distance desired to expel air, yet not to permit extrusion of the material into the slight separation 41. Whatever distance is chosen, it is seen that the mold plates will tend to normalize at a particularly spaced amount predetermined by the particular bumping assemblage. Thus the molding operation of a product is consistent and the product is assured of uniformity for successive molding operations since the bumping assemblage functions in a mechanically constant manner.

It will, of course, be understood that various changes may be made in the form, details, arrangements and proportions of the parts without departing from the scope of my invention as set forth in the appended claim.

What is claimed is:

A mold bumping assemblage for a rubber mold and the like comprising:

(a) a pair of cooperating mold plates having generally planar confronting surfaces, (b) at least one of said plates having its planar surface recessed to define a mold cavity located laterally inwardly from the marginal edges thereof and one of said mold plates having a recess portion for the accommodation of molten material with a connecting sprue leading to said mold cavity;

(c) means biasing said mold plates apart;

(d) retainer means limiting to a slight separation the distance to which the mold plates are biased apart so as to maintain substantially the shape and size of said cavity, and (e) a molding ram having one end movable into said recess portion, upon application of force thereto, to act against said material to force said molten material into said mold cavity via said sprue and to overcome the force of said biasing means and to bring the confronting surfaces of said mold plates into abutment for a molding operation, (f) the slight separation of said mold plates produced by said biasing means and said retainer means upon momentary removal of force upon said ram allowing entrapped air to be released from said cavity for escape between said surfaces in various lateral directions.

References Cited in the file of this patent
UNITED STATES PATENTS
2,938,232 Martin _____ May 31, 1960
FOREIGN PATENTS
563,537 Canada _____ Sept. 23, 1958